(No Model.)
W. I. BUNKER.
GEARING.
No. 492,778. Patented Mar. 7, 1893.
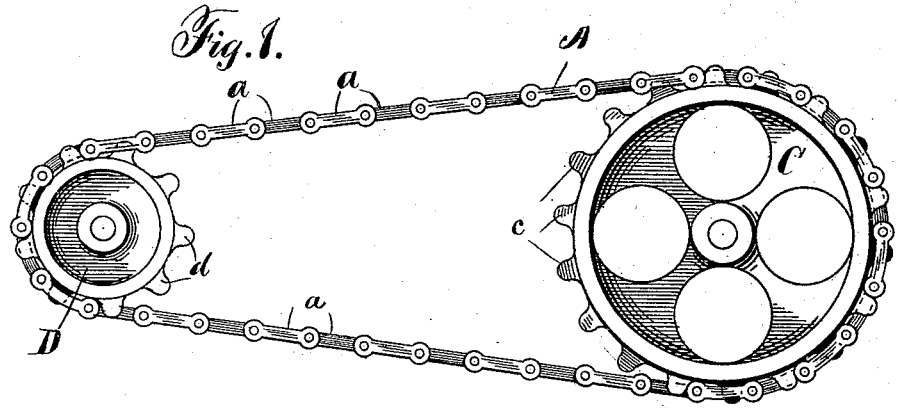
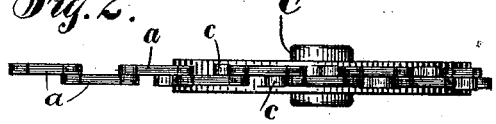
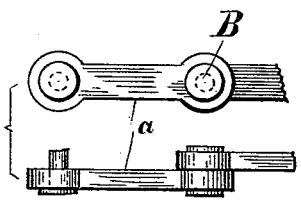
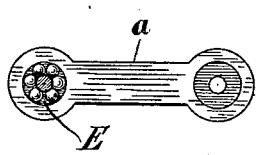
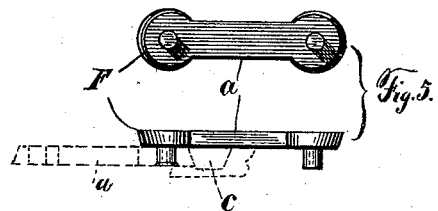
Witnesses.
Inventor
William I. Bunker
By Banning and Banning and Payson
Attorneys

UNITED STATES PATENT OFFICE.

WILLIAM I. BUNKER, OF LA GRANGE, ILLINOIS.

GEARING.

SPECIFICATION forming part of Letters Patent No. 492,778, dated March 7, 1893.

Application filed November 22, 1892. Serial No. 452,759. (No model.)

*To all whom it may concern:*

Be it known that I, WILLIAM I. BUNKER, a citizen of the United States, residing at La Grange, Illinois, have invented certain new and useful Improvements in Gearing, of which the following is a specification.

The object of my improvement has particular reference to the driving chain or link belt connecting the driving and driven wheels of the bicycle; and my invention consists in the features and details of construction hereinafter described and claimed.

In the drawings, Figure 1 is a side elevation of the sprocket wheels of a bicycle, provided with my improved chain belt. Fig. 2 is a plan view of the driving wheel with a portion of the belt. Fig. 3 is a side elevation and plan view, respectively, of a portion of the belt. Fig. 4 is a side elevation of a modified form of link; and Fig. 5 is a side elevation and a plan view respectively of another modified form of link.

One serious objection to driving chains or link belts, as now used on bicycles, grows out of the fact that the links are each formed of two parallel sides or bars which afford places in which dirt and other obstructions may be deposited and accumulate. In addition to this, the chain or belt is necessarily of greater weight than desirable, as, of course, it is a desideratum in bicycles to secure as great lightness with the requisite strength as possible. In addition to these objections, it has been found in practice that there is a liability of the chains, as now made, being thrown off the sprocket wheels in passing around curves, where the sprockets fail to always properly enter the space in the link intended for them, as well as when the links become clogged with dirt or other obstructions, as above explained. It is to obviate these objections that my invention is particularly intended, as well as to secure certain advantages that will be apparent to the makers and users of such chains.

In making my improved gearing, I make the chain, A, of single links, a, and fasten the links together by headed rivets, B, as shown in Fig. 3, or otherwise, as hereinafter explained. These links when thus fastened together present in the chain, when viewed from above, an alternation of links and spaces on each side of the chain or belt. This is represented in Fig. 1 by the shading, as well as plainly shown in Fig. 2. As there is no bar or plate on one side of these spaces, there is, of course, no opportunity for mud, gravel, or other obstructions to fall and remain therein, as in the case of the double bar links now in use. I provide the driving wheel, C, and the driven wheel, D, with a series of sprockets or lugs c and d, extending out from their peripheries and adapted to engage the chain on opposite sides in alternating series, as represented by the shading in the driving wheel of Fig. 1, and as plainly shown in Fig. 2. These lugs by being thus arranged are adapted in the rotation of the wheel to respectively engage the ends of the bars composing the chain or belt by turning into the spaces alternating from side to side of the chain. In this way, the chain is retained in place and driven by the sprockets or lugs working alternately on each side of it. The links composing the chain or belt may be fastened together in various ways. In Fig. 3 I have shown them connected together by a rivet B, headed at each end. In this case the sides of the bars, at their ends, preferably lie against each other, although a washer can be placed between them if desired.

In Fig. 4 I have shown a recess and a number of balls E, arranged in the inner face or side of the end of the link, so that when another link is riveted to it, there will be afforded a ball bearing between them to diminish or prevent friction.

In Fig. 5 I have shown the ends of the links slightly beveled, as at F, and the ends of the links fastened together by pins or rivets, preferably swaged integrally with the ends of one bar to engage holes in the ends of the next bar, as represented in the two links shown. By thus beveling the ends of the links, I insure a proper and secure engagement with them by the sprockets or lugs of the wheels, which, in that case, are preferable correspondingly beveled to properly engage them.

What I regard as new, and desire to secure by Letters Patent, is—

1. The combination of a driving chain provided with links alternating from side to side of the chain, and driving and driven sprocket wheels provided with receiving sprockets alternating from side to side and adapted to engage the chain on opposite sides in alternating series, substantially as described.

2. The combination of a driving chain provided with links beveled inwardly at their ends and alternating from side to side of the chain, and driving and driven sprocket wheels provided with beveled sprockets adapted to engage the chain on opposite sides in alternating series, substantially as described.

WILLIAM I. BUNKER.

Witnesses:
SAMUEL E. HIBBEN,
THOS. F. SHERIDEN.